Aug. 28, 1928.
A. E. SCHEIN
1,682,190
THRUST BEARING
Original Filed Oct. 4, 1924　　2 Sheets-Sheet 1
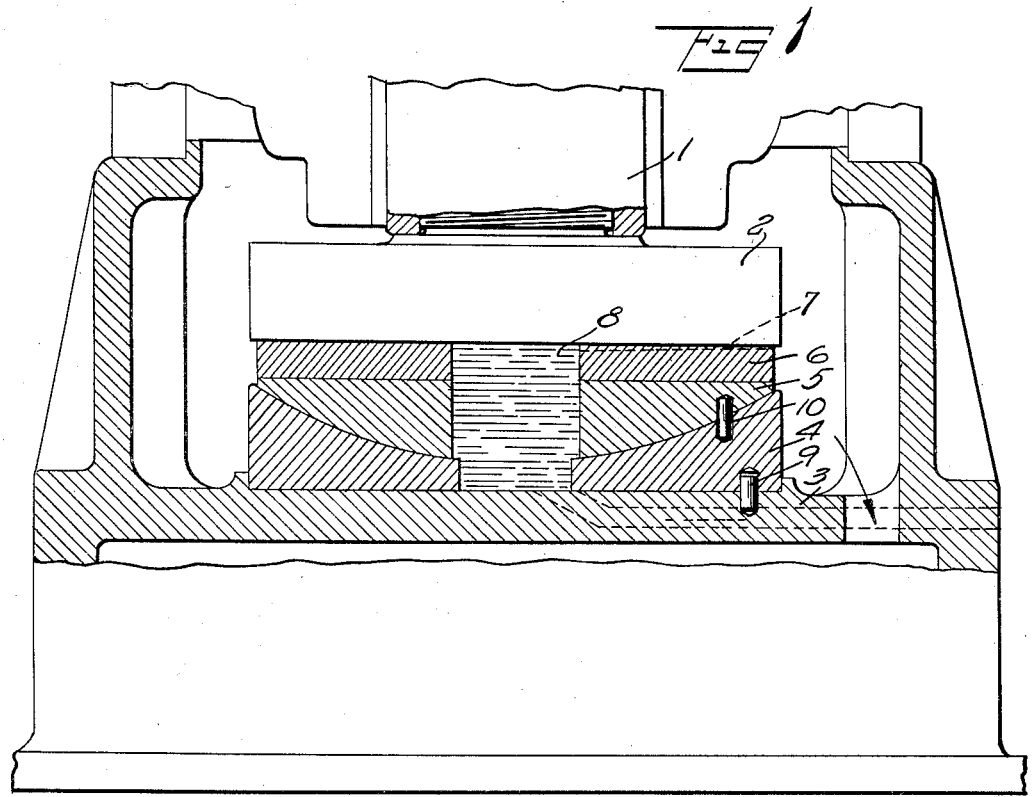
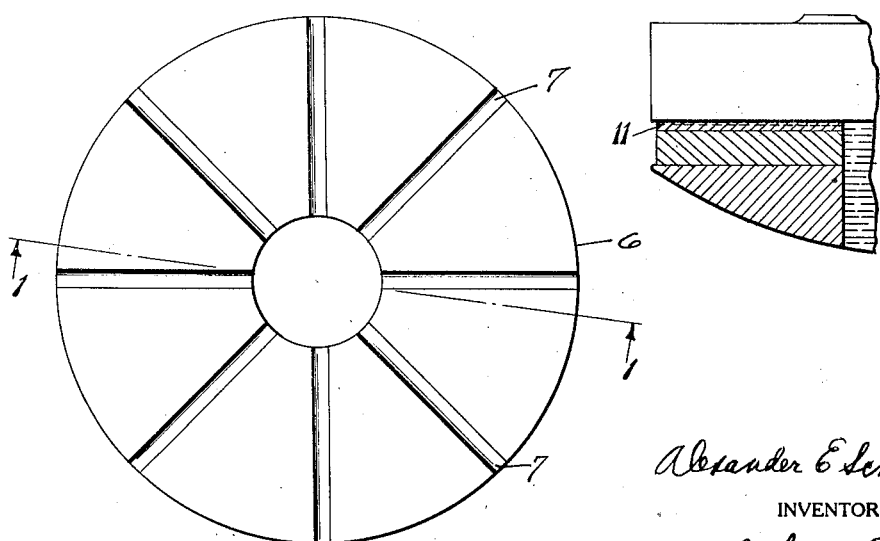
Alexander E Schein
INVENTOR
BY Richard Eyre
ATTORNEY Aug. 28, 1928.
A. E. SCHEIN
1,682,190
THRUST BEARING
Original Filed Oct. 4, 1924    2 Sheets-Sheet 2
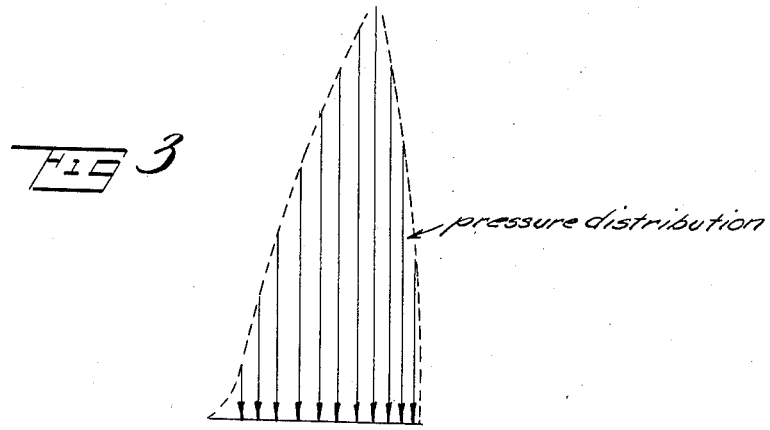
Fig. 3 — pressure distribution
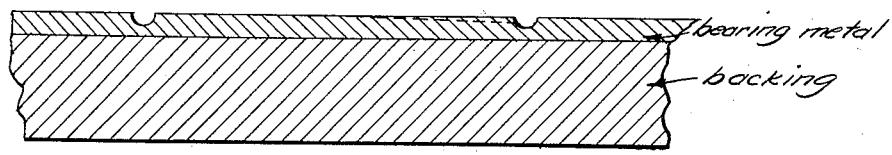
bearing metal
backing
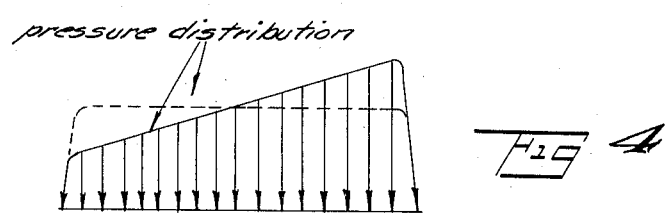
pressure distribution
Fig. 4
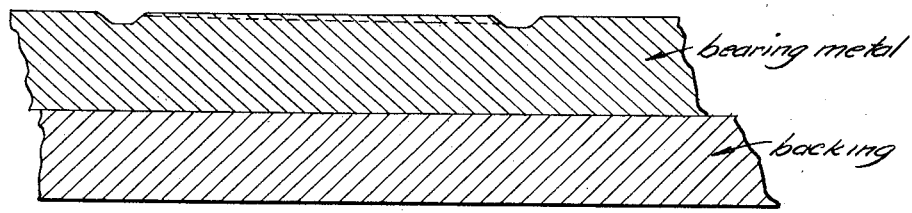
bearing metal
backing
Alexander E. Schein  INVENTOR
Richard Eyre  BY
ATTORNEY Patented Aug. 28, 1928.

1,682,190

UNITED STATES PATENT OFFICE.

ALEXANDER E. SCHEIN, OF FLUSHING, NEW YORK, ASSIGNOR TO THE SPERRY GYROSCOPE COMPANY, OF BROOKLYN, NEW YORK, A CORPORATION OF NEW YORK.

THRUST BEARING.

Application filed October 4, 1924, Serial No. 741,541. Renewed July 7, 1928.

My invention relates to thrust bearings and especially to a means I have devised whereby I may efficiently produce a well oiled thrust surface and satisfactorily uniform distribution of pressure over the thrust surface of the bearing.

In thrust bearings it has been customary to draw in oil between the bearing surfaces at intervals around the bearing, the purpose being to ensure a substantial coating of sufficiently cool oil over the entire area of the bearing surfaces. With simple constructions of this kind, however, the distribution of pressure around the bearing has been very unequal, due to the fact that the oil wherever entering the bearing is relatively colder, and, therefore, more viscous than where leaving from between the bearing surfaces. Because the film of oil is several times thicker where entering between the bearing surfaces than where leaving, the pressure is very largely concentrated at the entering points, and there are frequently areas which the oil never reaches, thus causing the bearing to be inefficient, to wear unequally, and to lack durability.

It has been proposed to meet this difficulty by forming one of the thrust members in sections, each mounted for universal movement, but this is expensive and has the disadvantages inherent in all unnecessarily complicated structures. Heretofore I have described another solution of this problem (application for patent Serial No. 537,709, filed February 20, 1922). This earlier solution of mine provided a bearing surface made up of a number of separate wedge shaped blocks of bearing metal imbedded in a brass backing. The blocks were made wedge shaped so as to be relatively very thick at one end and thin at the other, in order that the compression resulting from a pressure uniformly distributed against the back of these wedge pieces would produce an unequal compression, thereby automatically producing the desired wedge shape for the oil film between the bearing surfaces. This solution of the problem also involves considerable complication and expense, and, moreover, makes it necessary to use a metal backing, such as brass, which has a coefficient of expansion substantially that of the bearing metal employed, whereas it is cheaper to employ steel as such backing, and steel is also a more suitable metal for such heavy work. Another objection to the thrust bearing of my said former application is that the bearing is adapted only for a given direction of rotation, it being necessary that the thicker end of the wedge shaped sections shall be at the leading end.

By my present invention I am enabled to obtain a thorough oiling of the bearing surfaces and a satisfactory distribution of pressure, and yet provide a bearing of simple construction in which a steel casting of uniform thickness may be used as the backing, and which is capable of rotation in either direction. My invention involves the inclusion in the thrust bearing of a plate of metal having a sufficiently low modulus of elasticity combined with sufficiently high elastic limit to carry the total lead, and of such thickness that the mean pressure per square inch will elastically compress the plate in the direction of its thickness an amount equal to the mean thickness of the oil coating desired in the thrust bearing. Preferably this plate is a ring of bearing metal carrying the bearing surface of the stationary member of the thrust bearing, in which case it is much thicker than the ordinary Babbitt rings heretofore employed in thrust bearings. This plate may, however, be, for example, a ring soldered to or even merely in contact with the back of a thin bearing plate of higher modulus of elasticity. By thus selecting the proper metal and its minimum thickness the varying temperature of the oil between the bearing surfaces and, therefore, its varying thickness react through the surface of the bearing metal upon this compressible plate to cause a very elastic compression thereof so that there may be substantially the theoretical form of oil film that will permit a ready relative flow along the bearing surfaces, thus avoiding any undue overheating of the oil and any undue wear on any part of the surface.

Referring to the drawings,

Fig. 1 is a cross section of a simple form of vertical thrust bearing which includes one embodiment of my invention;

Fig. 2 is a plan view of the bearing surface of the bearing member 6;

Figs. 3 and 4 are diagrammatic figures illustrating the difference in the oil film and pressure distribution between an ordinary simple thrust bearing and one constructed in accordance with my present invention.

Fig. 5 is a section illustrating a modification of the bearing of Fig. 1.

In Fig. 1, 1 represents a vertical shaft, to which is screwed the thrust plate 2; 3 is a base suitably supported, upon which rests the retaining washer 4. The retaining washer is provided with a spherical surface, as shown, and supports the similar spherical surface of a retaining washer 5, to which is soldered the ring 6 of the bearing metal. As is usual in thrust bearings, the retaining washer 4 is held from rotation on the base 3 by dowel pins, such as 9, and similarly the thrust bearing is prevented from rotating on the retaining washer by similar dowel pins 10.

As shown in Fig. 2, the member 6 is provided at intervals with grooves 7 as shown in Fig. 2, one of which is indicated by the dotted line in Fig. 1. 8 is an oil chamber from which the oil passes outward through the grooves 7, and from each groove is drawn between the bearing surfaces, the groove being of a suitable shape, as indicated in Fig. 4, to facilitate such flow. It is preferable that these grooves, as indicated by the dotted line 7 in Fig. 1, should taper upwards towards the outside of the bearing because the inner ends of the grooves must carry the entire oil to be distributed along the entrance between the bearing surfaces.

As previously stated, the essence of my present invention resides in the dimensioning of the bearing metal to produce a suitable oil film with a satisfactory distribution of pressure. I have shown in Fig. 3 the typical pressure distribution in the ordinary thrust bearings which are provided with thin plates of bearing metal. The thickness and composition of these plates has heretofore been determined without reference to any compressibility of the metals so that a thickness of a small fraction of an inch has always been deemed ample and, usually, the metal has had a relatively high modulus of elasticity. The dotted line in the diagram indicates approximately the character of the oil space between the metallic surfaces. As the oil travels to the left over the bearing surface and becomes rapidly heated, it becomes thinner and thinner until for all practical purposes as to distribution of pressure it may be considered as of no thickness, and, in fact, in many cases the rear edge of each section has a negative pressure. As a result, the pressure distribution is substantially as indicated in Fig. 3 or at the leading edge of each section of the bearing metal.

To obtain a proper oil film by properly determining the thickness of the bearing metal to be used, I first ascertain for any type of bearing of expected conditions of operation, the mean thickness of the wedge shaped oil film that is most desirable. This thickness is proportional to the viscosity of the oil used, multiplied by the mean velocity of the rotating bearing, divided by the pressure per square inch upon the bearing. This thickness is ordinarily a fraction of a thousandth of an inch. Having determined this desired mean thickness for the oil film, the thickness to be selected for the bearing metal may be determined by the following formula, in which C is the desired compression of the bearing metal in inches corresponding to the desired mean thickness of the oil film; M is the modulus of elasticity of the particular bearing metal employed, and P is the pressure per square inch applied to the thrust bearing.

$$\text{Thickness} = \frac{C \times M}{P}$$

Thus, suppose it be determined that the mean thickness of oil in any particular case should be .00045, that a particular metal is selected as the bearing metal and has a modulus of elasticity of 1,000,000, that the mean pressure in pounds per square inch is 450, the thickness would be an even inch.

Fig. 4 shows approximately the distribution of pressure and by the dotted line the form of the oil film. The thickness of the metal being such that the mean thickness of the oil film is produced at approximately the center of the bearing section, the pressure will increase above the mean towards the leading edge, producing greater compression of the metal and thicker oil film, and will reduce below the mean pressure at the trailing end producing the relatively small compression and thin oil film, which is the desired condition.

It will be noted that slight reductions from the thickness found by the formula will only slightly alter the form of the oil film and may still be practicable. On the other hand, any departures in the method of thickening the bearing metal from the particular thickness found from the formula will still obtain the desired form and thickness of the film, and will result in a slightly more uniform distribution of pressure, but ordinarily there would not be enough advantage in substantially thickening the plate beyond what is determined from the formula to compensate for the additional cost and size of the bearing.

Fig. 5 illustrates a modification. In this case the ring 11, which is the actual bearing ring, is a thin ring similar to rings that have heretofore been employed, but between this ring and the steel backing is a ring of the proper thickness with reference to its modulus of elasticity so that by the compression of this intermediate ring the same result is achieved. This intermediate ring may be either formed integral with or merely engage the bearing metal. In some cases this modification may be preferred where it is desired to use an actual surface of a relatively hard metal having a relatively high modulus of elasticity, the intermediate ring being preferably of lower modulus of elasticity so that it need not be unduly thick.

While I have illustrated two specific embodiments of my invention, and for one particular bearing have given precise figures for a desirable thickness of metal, I do not desire to be limited to this particular embodiment of my invention or the particular dimensions given, or otherwise, except as limited by my claims. For example, in the embodiments illustrated, the thick bearing plate of low modulus of elasticity is a continuous ring, and both the thin plate and the backing are continuous rings, and while I ordinarily prefer such continuity, I do not desire to be limited to such non-sectionalism of these rings.

Having thus described my invention, what I claim and desire to protect by Letters Patent is:

1. In a thrust bearing of the type in which means are provided at intervals for drawing oil in between the bearing surfaces dividing the plate into sections and a given pressure is maintained upon the bearing, a member located to transmit the thrust pressure through it, said member having a relatively low modulus of elasticity and a substantially uniform relatively great thickness so that each section may be elastically deformed into a wedge shape from end to end by unequal distribution of pressure generated by the wedging action of the oil film as it enters the bearing between said sections.

2. In a thrust bearing, a plate of Babbitt material located to transmit the thrust pressure through it with such distribution of pressure as exists at the bearing surface, said plate having a much greater thickness than ordinarily employed and a low modulus of elasticity with reference to the mean pressure per square inch and the desired mean thickness of oil between the bearing surfaces so that the babbitt is elastically compressed to an unequal degree to produce a tapered surface by a wedge shaped layer of oil of said mean thickness.

3. In a thrust bearing of the type in which means are provided at spaced points for drawing oil in between the bearing surfaces, and a given pressure is maintained upon the bearing, a Babbitt member carrying one of the bearing surfaces and having a uniform thickness predetermined with relation to its own modulus of elasticity and the mean pressure employed in the bearing so that it will be elastically deformed by the varying pressure of the oil due to its varying viscosity as it passes along the bearing surface to permit a tapered oil film to build up of greater thickness immediately beyond said points of entry and tapering to a minimum thickness immediately before the next point of entry.

4. In a thrust bearing having spaced points of entry for the oil, a plate of metal located to transmit the thrust pressure to and over the bearing surface, said plate having a modulus of elasticity of about 1,000,000, and of much greater than the normal thickness and particularly dimensioned for the bearing to enable it to elastically deform to provide a wedge-shaped oil film of decreasing thickness away from the points of entry for the oil.

In testimony whereof, I have signed my name to this specification.

ALEXANDER E. SCHEIN.